United States Patent [19]

Schadle

[11] 4,087,014

[45] May 2, 1978

[54] BOAT LOADING AND LAUNCHING CARRIER

[76] Inventor: Eugene J. Schadle, 86 Linet Ave., Highland Heights, Ky. 41076

[21] Appl. No.: 789,712

[22] Filed: Apr. 21, 1977

[51] Int. Cl.² .............................................. B60R 9/00
[52] U.S. Cl. ................................. 214/450; 214/146.5
[58] Field of Search ................ 214/83.24, 146.5, 450; 224/42.1 H; 9/39

[56] References Cited

U.S. PATENT DOCUMENTS

| 1,514,769 | 11/1924 | Johnston et al. | 214/146.5 |
|---|---|---|---|
| 2,473,557 | 6/1949 | Woodruff | 9/39 |
| 3,139,203 | 6/1964 | Borger | 214/450 |
| 3,435,970 | 4/1969 | Sutton | 214/450 |
| 3,612,314 | 10/1971 | Cooper | 214/450 |
| 3,716,156 | 2/1973 | Risney | 214/450 |
| 3,777,922 | 12/1973 | Kirchmeyer | 214/450 |
| 3,905,499 | 9/1975 | Speidel | 214/450 |

*Primary Examiner*—L. J. Paperner

[57] ABSTRACT

A boat carrier frame is mounted upon a vehicle body and supports a rear roller that engages the gunwales of the boat. A boat controlling carriage rides upon the roller and has a rear portion connected by a separable hinge means with the stern of the boat. The carriage has a stop depending from its front portion which engages the roller during boat loading and launching operations. A power operated line is connected to the mid-portion of the boat and runs over a pulley on the front end of the carriage to load or launch the boat.

4 Claims, 8 Drawing Figures

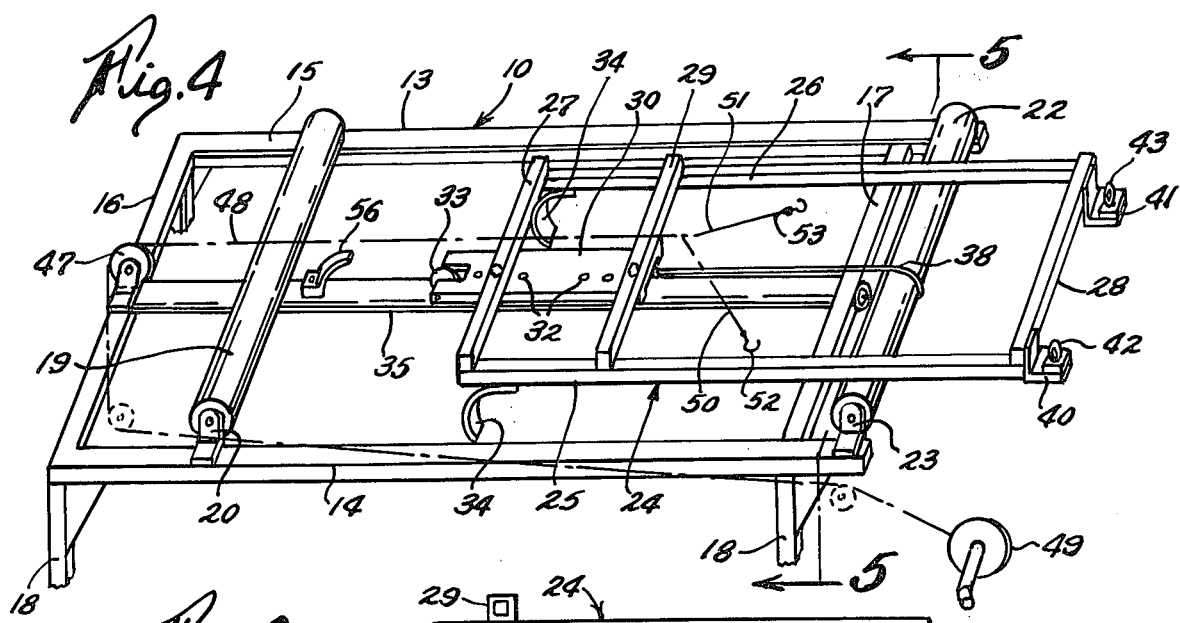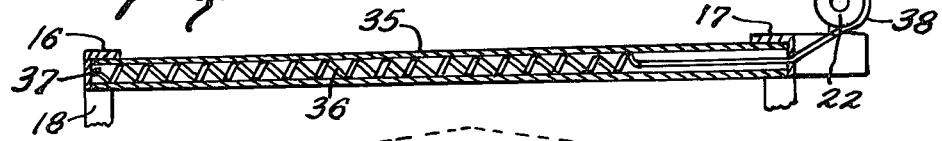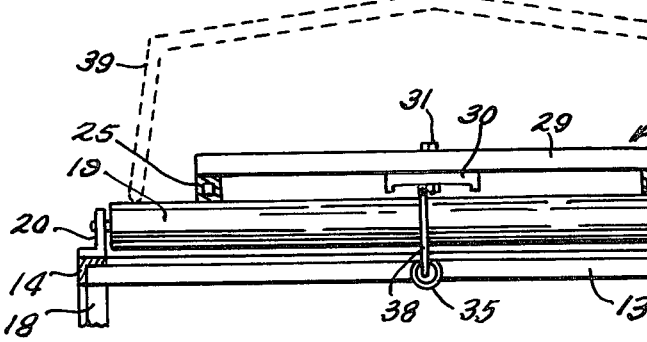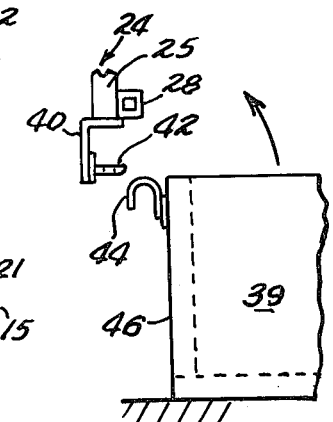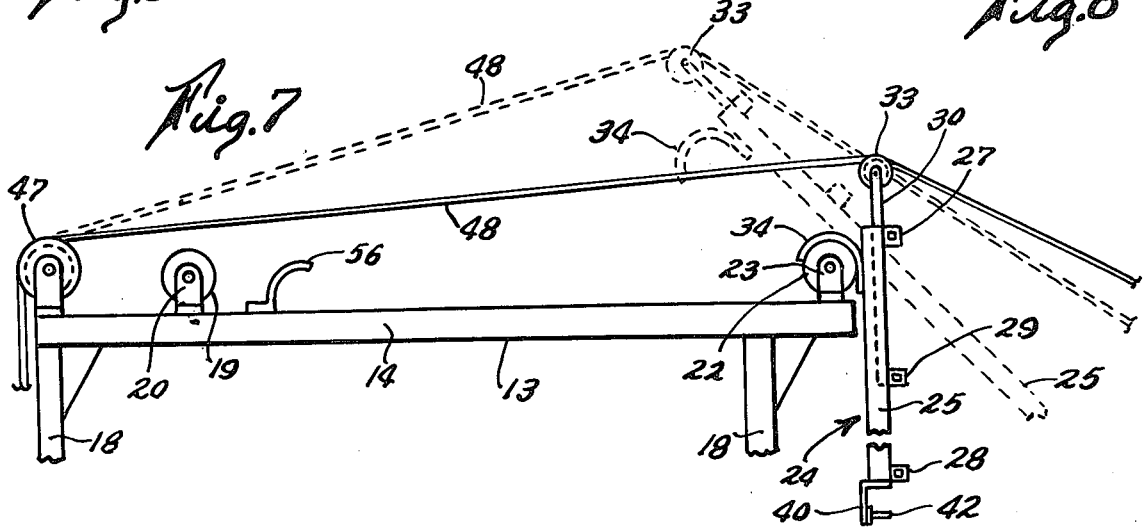

4,087,014

BOAT LOADING AND LAUNCHING CARRIER

The present invention relates to an improved carrier especially adapted to load and launch boats to and from the tops of vehicles, such as automobiles, trucks, campers and like vehicles.

An object of the invention is to provide a novel carrier having a few simple but rugged parts that cooperate in an improved manner to secure a fast, one man operation for loading and launching a boat.

Another object of the invention is to provide an improved loading and launching carrier that cooperates with a few separable fastening means; one cooperative part of each fastener means being readily mounted on a boat by an unskilled person in a minimum of time.

A further object of the invention is to provide a boat loader and launcher capable of efficient operation on flat terrain or on inclined surfaces which generally exist around the banks of rivers and lakes.

A still further object of the invention is to provide an improved separable, hinged connector means between a boat and a carrier having the above noted characteristics.

Other objects of the invention will become apparent from the following specification taken in conjunction with the accompanying drawings, wherein:

FIG. 4 is a perspective view of the carrier shown in FIGS. 1-3 of the drawings.

FIG. 5 is a section taken on line 5—5 of FIG. 4.

FIG. 6 is a fragmental, sectional view depicting a detail of my carrier mechanism.

FIG. 7 is a side elevational view showing the carrier mechanism in a boat launched condition, the dotted lines indicating an intermediate position of the carrier between boat loaded and launched conditions.

FIG. 8 is a fragmental, side elevational view showing the cooperative parts of my separable fastener means between a boat and the carrier mechanism.

Figure 1:
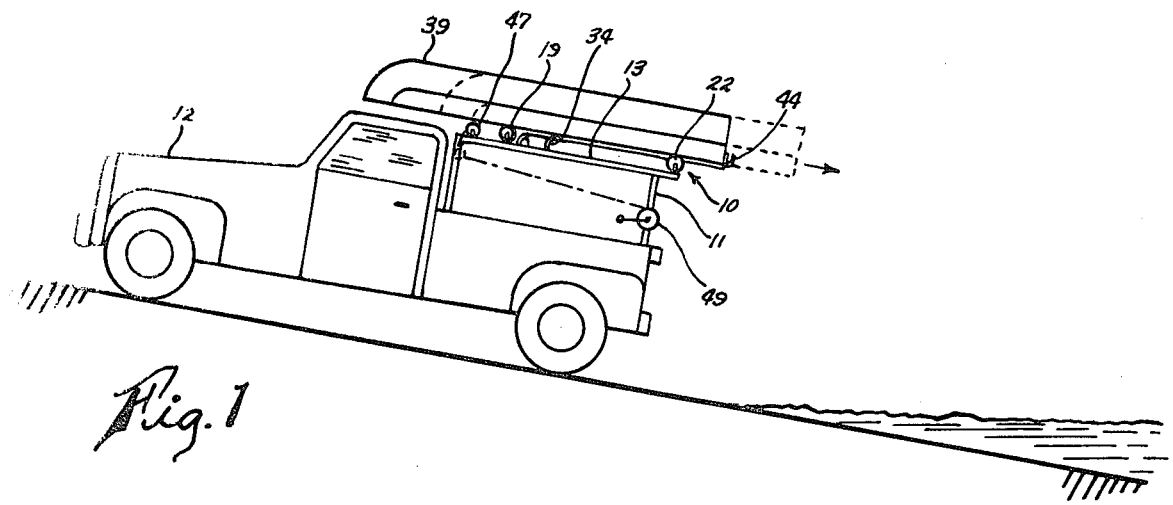
FIG. 1 is a side elevational view of my carrier mechanism in boat loaded position upon a vehicle body.

Referring in detail to the drawings my boat loading and launching carrier mechanism 10 is preferably illustrated in connection with the ladder frame 11 of a pick-up truck 12 but, it could be associated with the tops of other vehicles in other conventional manners.

As best shown in FIG. 4 of the drawings, the boat carrier mechanism has a mounting frame 13 comprised of a pair of longitudinal side members 14 and 15 that are connected by cross members 16 and 17; vertical feet 18 depending from the frame for engagement with the top structure of a vehicle body.

The frame 13 mounts a laterally extending boat supporting roller 19 upon its forward end portion, said roller having bearings 20 and 21 mounted upon the frame side members 14 and 15, respectively. A laterally extending roller 22 is mounted between bearings 23—23 positioned on the frame side members 13 and 14 and preferably on portions of the side members that extend rearwardly beyond the rear legs 18—18 of the frame.

A rectangularly shaped boat controlling carriage 24 rides upon the roller 22 and consists of a pair of laterally spaced, longitudinally extending side rails 25 and 26 rigidly connected together by a forward cross member 27, a rear cross member 28 and an intermediate cross member 29. The forward and intermediate cross members 27 and 29, respectively, have mounted between them a forwardly extending arm 30 which is preferably adjustable by means of through bolts 31 that may engage in a series of longitudinally extending holes 32 in the arm (FIGS. 4 and 5). The extended free end of the arm 30 mounts a follower roller 33 while a pair of carriage pivot means such as rearwardly facing hooks 34—34 depend from the underside of the carriage at the forward end thereof; both for purposes to be more fully explained hereinafter.

As best illustrated in FIG. 6 of the drawings a carriage biasing means may take the form of a longitudinal tube 35 mounted between the frame members 16 and 17 and enclosing a contractile, spiral spring 36. One end of the spring is fastened to the frame at 37 and its opposed end is secured to a cable 38 which passes through the member 17, up and around the roller 22 and fastened at its terminal end to the carriage 24 adjacent the intermediate cross member 29. The spring mechanism therefor is adapted to continuously bias the carriage rearwardly toward boat unloading condition.

With reference to FIGS. 4 and 8 of the drawings, my separable, hinge connector means between the boat carriage 24 and a boat 39 comprises a pair of laterally spaced apart brackets 40 and 41 positioned on the rear portion of the carriage. Each bracket 40 and 41 mounts an eye 42 and 43, respectively, in spaced relation to said rear portion, the axis of each eye opening being disposed in the longitudinal direction of the carriage. A pair of laterally spaced, downwardly facing hooks 44 and 45 is bolted to the upper, exterior portion of the stern 46 of the boat, the brackets 40 and 41 providing sufficient clearance between the eyes and the carriage portion to permit the hooks to engage or be detached from the eyes, allowing the boat to pivot on the carriage through substantially a 90 degree arc and also limiting longitudinal movement of the boat on the carriage in their loaded positions.

An idler pulley 47 is mounted upon the central portion of the front cross member 16 of the frame 10 and engages a line 48 controlled by a reversible power means, such as a hand operated winch 49, secured to some convenient part of the vehicle 12. The line is passed around directional pulleys, as required, depending upon the construction of the vehicle body. The free end of the line 48 is divided into two branches 50 and 51 (FIGS. 3 and 4), each having a hook 52 and 53, respectively, secured to its terminal end for engaging suitable laterally spaced eyelets 54 and 55, respectively, mounted upon an intermediate part of the gunwales of the boat 39.

In Operation it will be understood, especially from FIGS. 1-3 and 7, that in transported position the boat 39 has its opposed gunwales resting upon the rollers 19 and 22 (FIG. 1), the winch creating tension in the line 48 against the bias in the spring means 36, the roller 33 being held under a stop hook 56 mounted upon the tube 35. It is to be understood that in this boat loaded position the carriage 24 is substantially horizontal and the cooperative eyes 42 and 43 and hooks 44-45 are 90° from the position shown in FIG. 6 whereby the stern portion of the boat will be held down upon the roller 22 while the bow portion is secured on roller 19 by the tension placed on the line by the winch 49 when the carriage roller 33 is forced against the stop hook 56. It is contemplated that a conventional tether (not shown) may supplement the hold down means just described, if desired.

To launch the boat from its loaded position shown in FIG. 1 the winch 49 is operated to pay out the line 48 and whether the vehicle 12 is in a level or in an inclined position the spring device 36 moves the boat rearwardly on the rollers 19 and 22 and, as the boat passes its center of gravity over the roller 22 the carriage and the boat begin slowly to tilt rearwardly and downwardly assuming substantially the position shown by dotted lines in FIG. 7, the roller 33 bearing upwardly on the line 48 easing the carriage and the boat into the vertical position shown in full lines in FIG. 7, it being noted that in said position the carriage pivot hooks 34—34 contact the roller 22 limiting further downward tilting movement of the carriage and the boat.

Figure 2:
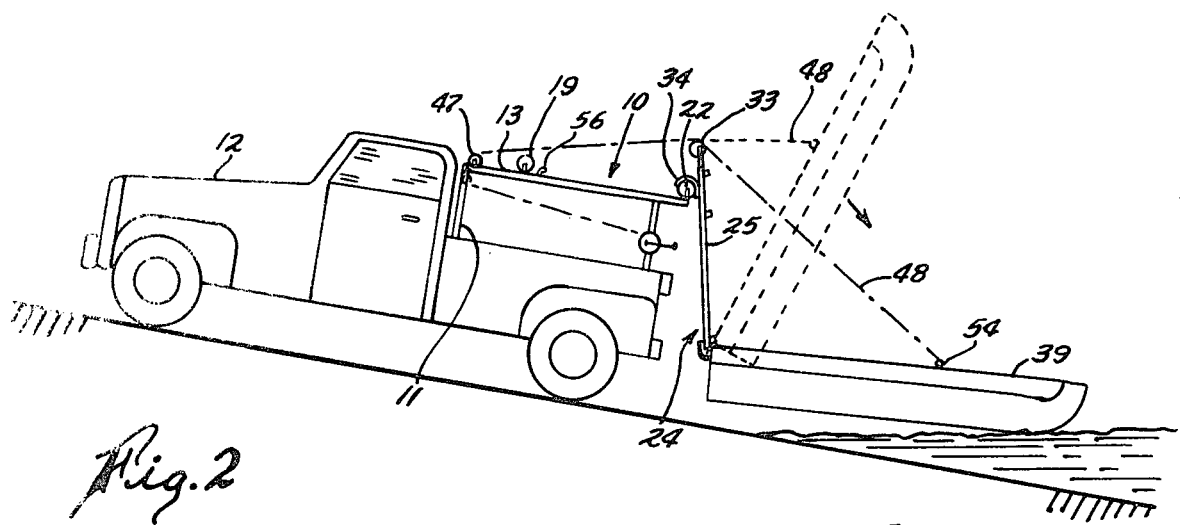
FIG. 2 is a side elevational view of the carrier mechanism in boat launched position; the dotted lines showing an intermediate position of the boat carrier mechanism.

Further pay out of the line 48 permits the boat to pivot on the cooperative hinge means, as indicated in FIG. 2 of the drawings, until the boat is in the launched position shown in full lines in FIG. 2. It is then only necessary to detach the line hooks 52 and 53 from the boat gunwale mounted eyes 54 and 55, respectively, and then lift the hooks 44 and 45, one at a time or together from the eyes 42 and 43, respectively.

Figure 3:
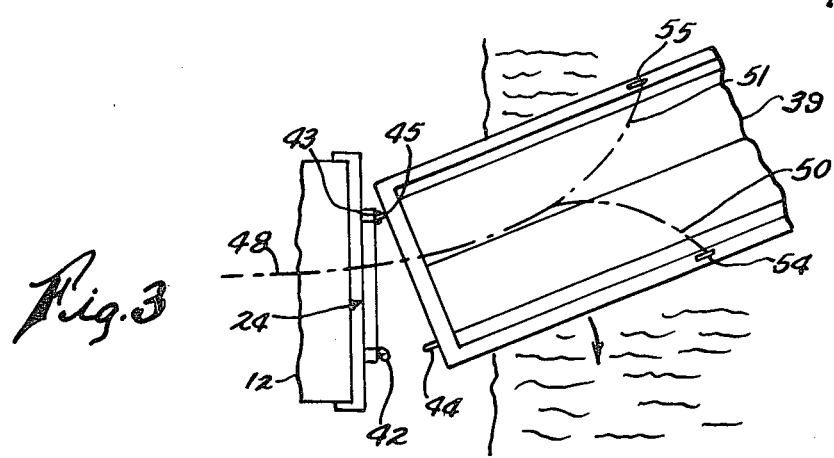
FIG. 3 is a fragmental, top plan view illustrating one method of attaching a boat to my carrier mechanism.

To load the boat on the carrier mechanism it is desirable, as shown in FIG. 3 of the drawings, to connect the line hooks 52 and 53 to the boat gunwale mounted eyes, attach one hook 45 in the carriage eye 43 and by winding in the line move the boat laterally around and in to square position with the carriage and then connect the other hook 44 to the eye 42. Continuous winding in of the line 48 by the winch 49 reverses the above described launching procedure to load the boat on the vehicle for transport thereon.

Although this invention has been described with particularity, it is understood that the present disclosure was made by way of example and that changes in structure may be made without departing from the spirit thereof as expressed in the accompanying claims.

What is claimed is:

1. A boat loading and launching carrier for vehicle bodies (comprising) having a frame secured upon ("a") the vehicle body (and having), a lateral boat supporting roller mounted upon the rear portion (thereof) of the frame, and a centrally disposed idler puller on the forward end of said frame; comprising a rectangular carriage having a pair of laterally spaced apart, longitudinally extending side rails moveably supported upon the roller; a carriage holddown means disposed centrally on the forward end of the carriage; (a pivot means) a pair of laterally spaced apart, rearwardly facing hooks secured beneath the forward end of the carriage and adapted to engage the roller to limit the downward movement of the carriage around the roller as the carriage and the boat approach gravity operated tilting positions; laterally spaced apart cooperative, separable (hinged) hinge means between the rear end of the carriage and the stern of (a) the boat; a line passed over the holddown means and around the idler pulley; laterally spaced apart, separable means connecting the free end of the line to an intermediate part of the boat; and a power operated reversible means on the vehicle body for controlling payout and winding in of the line, whereby tension in said line between the holddown means and the boat eases the carriage and the boat as they move on the roller from loaded toward tilted positions into engagement of the (pivot means) hooks with the roller.

2. A boat loading and launching carrier as set forth in claim 1 including a boat unloading biasing means comprising a contractile spring having one end connected to the forward end of the frame and its free end connected to a cable, said cable being passed under the roller and connected at its free end to an intermediate portion of the carriage.

3. A boat loading and launching carrier as set forth in claim 1 wherein the cooperative separable hinge means comprises a pair of laterally spaced apart eyes mounted on the rear end of the carriage, the axis of the respective eye openings disposed in the longitudinal direction of the carriage, and downturned hooks mounted on the upper exterior portion of the boat stern and receivable in the eyes.

4. A boat loading and launching carrier as set forth in claim 1 wherein the separable means connecting the end of the line to the boat comprises eyes mounted upon the gunwales of the boat and the line has two branches at its terminal end, each branch line having an end hook engageable in an eye on a gunwale.

* * * * *